(12) United States Patent
Wiegele

(10) Patent No.: US 10,604,420 B2
(45) Date of Patent: Mar. 31, 2020

(54) METHOD AND APPARATUS FOR RESERVOIR FREE AND VENTLESS WATER FILTERING

(71) Applicant: Brita LP, Oakland, CA (US)

(72) Inventor: Jonathan Taylor Wiegele, Pleasanton, CA (US)

(73) Assignee: Brita LP, Oakland, CA (US)

( * ) Notice: Subject to any disclaimer, the term of this patent is extended or adjusted under 35 U.S.C. 154(b) by 412 days.

(21) Appl. No.: 14/132,134

(22) Filed: Dec. 18, 2013

(65) Prior Publication Data

US 2015/0166364 A1    Jun. 18, 2015

(51) Int. Cl.
*C02F 1/28* (2006.01)
*B01D 35/30* (2006.01)
*C02F 1/00* (2006.01)
*B01D 29/11* (2006.01)
*C02F 1/42* (2006.01)
(Continued)

(52) U.S. Cl.
CPC ............ *C02F 1/003* (2013.01); *B01D 29/114* (2013.01); *B01D 35/30* (2013.01); *C02F 1/002* (2013.01); *C02F 1/283* (2013.01); *C02F 1/42* (2013.01); *C02F 2101/12* (2013.01); *C02F 2101/20* (2013.01); *C02F 2303/185* (2013.01); *C02F 2307/02* (2013.01); *C02F 2307/04* (2013.01)

(58) Field of Classification Search
None
See application file for complete search history.

(56) References Cited

U.S. PATENT DOCUMENTS

| 2,689,048 A | 9/1954 | Powers |
| 3,016,984 A | 1/1962 | Getzin |
| 3,497,069 A | 2/1970 | Lindenthal et al. |

(Continued)

FOREIGN PATENT DOCUMENTS

| EP | 0402661 | 12/1990 | |
| EP | 0402661 A1 * | 12/1990 | ................ C02F 1/28 |

(Continued)

OTHER PUBLICATIONS

NPL-1 ("Activated Carbon Filter Bags", Filterek) Date: Jun. 4, 2012.*

(Continued)

*Primary Examiner* — Patrick Orme
(74) *Attorney, Agent, or Firm* — Thomas C. Feix

(57) ABSTRACT

An on-demand filter structure including a first hydrophilic protective layer comprising a first surface exposable to a stream of water. A contact area on the first surface receives the stream. The first hydrophilic protective layer receives the stream and distributes water out a second surface, primarily using gravity. An activated carbon felt (ACF) layer is adjacent to the second surface, wherein the ACF layer is configured for water filtration, primarily using gravity. A second hydrophilic protective layer includes a third surface adjacent the ACF layer and a fourth surface. The third surface receives filtered water from the ACF layer, and the fourth surface expels the filtered water primarily using gravity, wherein the first and second hydrophilic protective layers sandwich the ACF layer. A cross section of the first hydrophilic protective layer, the ACF layer, and the second hydrophilic protective layer has a curvature.

31 Claims, 8 Drawing Sheets

100B

(51) Int. Cl.
*C02F 101/12* (2006.01)
*C02F 101/20* (2006.01)

(56) References Cited

U.S. PATENT DOCUMENTS

| | | |
|---|---|---|
| 3,554,377 A | 1/1971 | Miller |
| 3,662,780 A | 5/1972 | Marsh |
| 4,066,551 A | 1/1978 | Stern |
| 4,096,742 A | 6/1978 | Musolf et al. |
| 4,154,688 A | 5/1979 | Pall |
| 4,259,096 A | 3/1981 | Nakamura et al. |
| 4,605,499 A | 8/1986 | Wise |
| 4,696,742 A * | 9/1987 | Shimazaki ............ 210/287 |
| 4,764,274 A | 8/1988 | Miller |
| 4,921,600 A | 5/1990 | Meissner |
| 4,948,499 A | 8/1990 | Peranio |
| 4,983,288 A | 1/1991 | Karbachsch et al. |
| 5,061,367 A | 10/1991 | Hatch et al. |
| 5,076,922 A | 12/1991 | DeAre |
| 5,202,183 A | 4/1993 | Hosako et al. |
| 5,225,078 A | 7/1993 | Polasky et al. |
| 5,609,759 A | 3/1997 | Nohren, Jr. et al. |
| 5,681,463 A | 10/1997 | Shimizu et al. |
| 5,897,779 A | 4/1999 | Wisted et al. |
| 5,904,854 A | 5/1999 | Shmidt et al. |
| 5,919,365 A | 7/1999 | Collette |
| 5,980,743 A | 11/1999 | Bairischer |
| 6,004,460 A | 12/1999 | Palmer et al. |
| 6,189,438 B1 | 2/2001 | Braun |
| 6,193,886 B1 | 2/2001 | Nohren, Jr. |
| 6,368,506 B1 | 4/2002 | Gebert et al. |
| 6,383,381 B1 | 5/2002 | O'Flynn et al. |
| 6,565,743 B1 | 5/2003 | Poirier et al. |
| 6,589,904 B1 | 7/2003 | Iwasak et al. |
| 6,599,427 B2 | 7/2003 | Nohren et al. |
| 6,733,669 B1 | 5/2004 | Crick |
| 7,473,362 B1 | 1/2009 | Nohren, Jr. |
| 7,828,969 B2 | 11/2010 | Eaton et al. |
| 8,051,989 B1 | 11/2011 | Tondreau |
| 8,080,160 B2 | 12/2011 | Yanou et al. |
| 8,133,525 B2 | 3/2012 | Skalski et al. |
| 2001/0035094 A1 | 11/2001 | Takagaki et al. |
| 2002/0020673 A1 | 2/2002 | Nohren et al. |
| 2002/0060176 A1 | 5/2002 | Mierau et al. |
| 2002/0066700 A1 | 6/2002 | Melitta |
| 2002/0083841 A1 | 7/2002 | Chaouachi et al. |
| 2002/0166811 A1 | 11/2002 | Walker et al. |
| 2005/0279768 A1 | 12/2005 | Chatrath |
| 2006/0144781 A1 | 7/2006 | Carlson et al. |
| 2007/0007296 A1 | 1/2007 | Guyot |
| 2007/0095758 A1 | 5/2007 | Bortun et al. |
| 2008/0128364 A1 | 6/2008 | Cloud et al. |
| 2008/0274312 A1 | 11/2008 | Schelling et al. |
| 2009/0039028 A1 | 2/2009 | Eaton et al. |
| 2009/0139926 A1 | 6/2009 | Melitta |
| 2009/0184042 A1 | 7/2009 | Steed et al. |
| 2010/0170839 A1 | 7/2010 | Kohl |
| 2010/0219151 A1 | 9/2010 | Risheq |
| 2010/0266351 A1 | 10/2010 | Vogel et al. |
| 2011/0079551 A1 | 4/2011 | Olson et al. |
| 2011/0079572 A1* | 4/2011 | Olson ............... B65D 1/0223 215/316 |
| 2011/0247975 A1 | 10/2011 | Rapparini |
| 2011/0303589 A1 | 12/2011 | Kuennen et al. |
| 2011/0305801 A1 | 12/2011 | Beer |
| 2012/0017766 A1 | 1/2012 | Anson et al. |
| 2012/0055862 A1 | 3/2012 | Parekh et al. |
| 2012/0061312 A1 | 3/2012 | Busick et al. |
| 2012/0187036 A1 | 7/2012 | Risheq |
| 2012/0193282 A1 | 8/2012 | Wolf et al. |
| 2012/0214375 A1 | 8/2012 | Kitano et al. |
| 2012/0255890 A1 | 10/2012 | Cumberland |
| 2012/0292247 A1 | 11/2012 | Moon et al. |
| 2012/0298570 A1 | 11/2012 | Osawa et al. |
| 2012/0298614 A1 | 11/2012 | Nelson |
| 2012/0325735 A1 | 12/2012 | Dick et al. |
| 2013/0037481 A1 | 2/2013 | Lalouch et al. |
| 2013/0045252 A1 | 2/2013 | Rawlings et al. |
| 2013/0095212 A1 | 4/2013 | Beer |
| 2013/0125748 A1 | 5/2013 | Taylor et al. |
| 2013/0156897 A1 | 6/2013 | Goldstein |
| 2013/0175228 A1 | 7/2013 | Utsch et al. |
| 2013/0199989 A1 | 8/2013 | Carter et al. |
| 2013/0233890 A1 | 9/2013 | Melzer |
| 2013/0319927 A1* | 12/2013 | Lin ............... 210/342 |
| 2014/0014566 A1 | 1/2014 | Mitchell |
| 2014/0151285 A1 | 6/2014 | Cur et al. |
| 2016/0167980 A1 | 6/2016 | Dani et al. |
| 2016/0376161 A1 | 12/2016 | Dani et al. |
| 2016/0376162 A1 | 12/2016 | Dani et al. |
| 2016/0376163 A1 | 12/2016 | Dani et al. |
| 2016/0376164 A1 | 12/2016 | Dani et al. |
| 2016/0376165 A1 | 12/2016 | Dani et al. |
| 2017/0001880 A1 | 1/2017 | Dani et al. |

FOREIGN PATENT DOCUMENTS

| | | |
|---|---|---|
| EP | 0617951 | 10/1994 |
| GB | 2268680 A | 1/1994 |
| GB | 2280596 A | 2/1995 |
| JP | 657489 U | 8/1994 |
| WO | 0071468 A1 | 11/2000 |
| WO | WO2011145646 | 11/2011 |
| WO | WO201231853 | 3/2012 |
| WO | WO2012150506 | 11/2012 |
| WO | WO201344079 | 3/2013 |
| WO | WO2013044079 | 3/2013 |
| WO | WO2013088260 | 6/2013 |
| WO | 2014089207 A1 | 6/2014 |
| WO | 2017055915 A1 | 4/2017 |
| WO | 2017055918 A1 | 4/2017 |

OTHER PUBLICATIONS

Oxford Dictionary Definition—coextensive, 2017, 1 page.*
Oxford Dictionary Definition—immediately, 2017, 2 pages.*
CamelBak: "CamelBak Relay Water Pitcher," published Jan. 22, 2014, p. 1, XP054977371. Retrieved from Internet: URL: https://www.youtube.com/watch?v=01TdZCF8AqY [retrieved on May 18, 2017].
Supplementary European Search Report EP 14870910.8, dated Jun. 8, 2017.
Supplementary European Search Report EP 14871227.6, dated Jun. 8, 2017.
Supplementary European Search Report EP 14871467.8, dated Jun. 8, 2017.
Supplementary European Search Report EP 14871701.0 dated Jun. 8, 2017.
Supplementary European Search Report EP 14871914.9, dated Jun. 13, 2017.
Supplementary European Search Report EP 14872175.6, dated Jun. 8, 2017.
Australian Office Action dated Dec. 20, 2018 in corresponding/related Australian Application No. 2014366927.
Office Action dated Mar. 4, 2019 in corresponding/related Australian Application No. 2014366937.

* cited by examiner

METHOD AND APPARATUS FOR RESERVOIR FREE AND VENTLESS WATER FILTERING

BACKGROUND

Water filtration has become common in homes, offices and other places to produce cleaner and better tasting water. One filtration system that is gaining popularity is the portable water bottle that can be easily carried and used in many different settings. The convenience of including a filtration feature within the portable water bottle makes the bottle much more attractive to users. For instance, the water bottle provides filtered water wherever there is a water source, such as drinking fountain or tap. As long as water is available, the user has access to filtered water. The filtration system generally includes a filter through which water passes to remove particles, chemicals, microbes, and the like. For proper operation, the filters should be changed periodically.

Conventional water bottles include a reservoir that accepts and holds unfiltered water before filtering. A couple of drawbacks to this system includes wasted space in the reservoir that could be used to hold filtered water, and a long wait period before filtered water is available to the user. The reservoir is needed because the filter system used in conventional water bottles has a flow rate that is slower than a fill rate typically experienced by any system providing water, such as, that from a drinking fountain or water faucet. As such, water held in the reservoir is slowly filtered through the filter system. Also, the reservoir is small so as to not take up too much space, thereby reserving the majority of space in the water bottle to hold filtered water. However, because the reservoir is small, it requires multiple fill and filter cycles before the water bottle is full. For example, a typical use case includes filling the reservoir with water, filtering the water in the reservoir, waiting for the reservoir to empty, and repeating the process until the water bottle is full with filtered water.

In another implementation, conventional water bottles have an active filtration system. That is, water must be pumped from a holding reservoir and through the filter system in order to obtain filtered water. In addition to the drawbacks of having a holding reservoir described above, this implementation requires a pumping mechanism to be configured into the water bottle. In some implementations, the pumping mechanism is activated by the user. For instance, the user would squeeze the water bottle to pump the water through the filter system. As a drawback, this implementation requires attention and action by the user to enable the filtration process before the user has access to filtered water.

In still other conventional water bottles, a venting system is required to vent a chamber holding filtered water. In particular, as filtered water is added to the chamber, displaced air is vented through a venting system. Without venting, the filter system would cease to operate due to excessive back pressure. While venting is a convenient solution, any venting system adds complexity to the design, and will add additional manufacturing costs to the water bottle.

SUMMARY

In embodiments of the present invention, an on-demand filter structure is disclosed. The filter structure includes a first hydrophilic protective layer including a first surface exposable to a stream of water. The first surface includes a contact area receiving the stream of water. The first hydrophilic protective layer is configured to receive the stream of water, and more particularly, a contact area in the first surface is configured to receive the stream of water. The first hydrophilic protective layer is also configured to distribute water out a second surface, primarily using gravity. The structure includes an activated carbon felt (ACF) layer adjacent to the second surface of the first hydrophilic protective layer, wherein the ACF layer is configured for water filtration, primarily using gravity. The structure includes a second hydrophilic protective layer that is configured for receiving filtered water from the ACF layer. More particularly, the second hydrophilic protective layer includes a third surface adjacent to the ACF layer configured for receiving the filtered water, and includes a fourth surface for expelling the filtered water, primarily using gravity. The first and second hydrophilic protective layers sandwich the ACF layer. In addition, a cross section of the first hydrophilic protective layer, the ACF layer, and the second hydrophilic protective layer has a curvature.

In another embodiment, another on-demand filter structure is disclosed. The filter structure includes a multi-layer filtration material configured for water filtration, primarily using gravity. The multi-layer filtration material has a curvature. The structure includes a support configured to receive the multi-layer filtration material and hold the filtration material in a set position. The support includes a first region and a second region separate from each other. The support includes a first opening that is configured for receiving a stream of water, wherein the structure is configured without an internal venting mechanism. The multi-layer filtration material is attached to the support such that a throughway is formed in the first region between the first opening and the multi-layer filtration material to allow the stream of water to contact the multi-layer filtration material along the curvature.

In still another embodiment, a method for filtering is disclosed. The method includes receiving a stream of water at first surface of a hydrophilic protective layer. The method includes distributing the stream of water through the first nonwoven layer and out a second surface of the first hydrophilic protective layer. The method includes filtering water from the stream of water through an activated carbon felt (ACF) layer adjacent to the second surface of the first hydrophilic protective layer. The ACF layer is configured for water filtration, primarily using gravity. The method includes receiving filtered water from the ACF layer at a third surface of a second hydrophilic protective layer, and distributing the filtered water throughout the second hydrophilic protective layer. The method includes expelling the filtered water out a fourth surface of the second hydrophilic protective layer. In the method, a cross section of the first hydrophilic protective layer, the ACF layer, and the second hydrophilic protective layer is defined by a curvature.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

For expository purposes, the term "horizontal" as used herein refers to a plane parallel to the plane or surface of an object, regardless of its orientation. The term "vertical" refers to a direction perpendicular to the horizontal as just defined. Terms such as "above," "below," "bottom," "top," "side," "higher," "lower," "upper," "over," and "under," are referred to with respect to the horizontal plane.

Accordingly, embodiments of the present invention provide for an on demand water bottle without the need for a reservoir to deliver gravity filtration. Other embodiments provide the above advantage and further provide for an on demand water bottle that has a high filtration flow rate which negates the need for a dedicated venting mechanism. Still other embodiments of the present invention provide the above accomplishments and further provide for a drink port that is in the same plane as a filter opening, which allows for single-handed use.

Figure 1A:
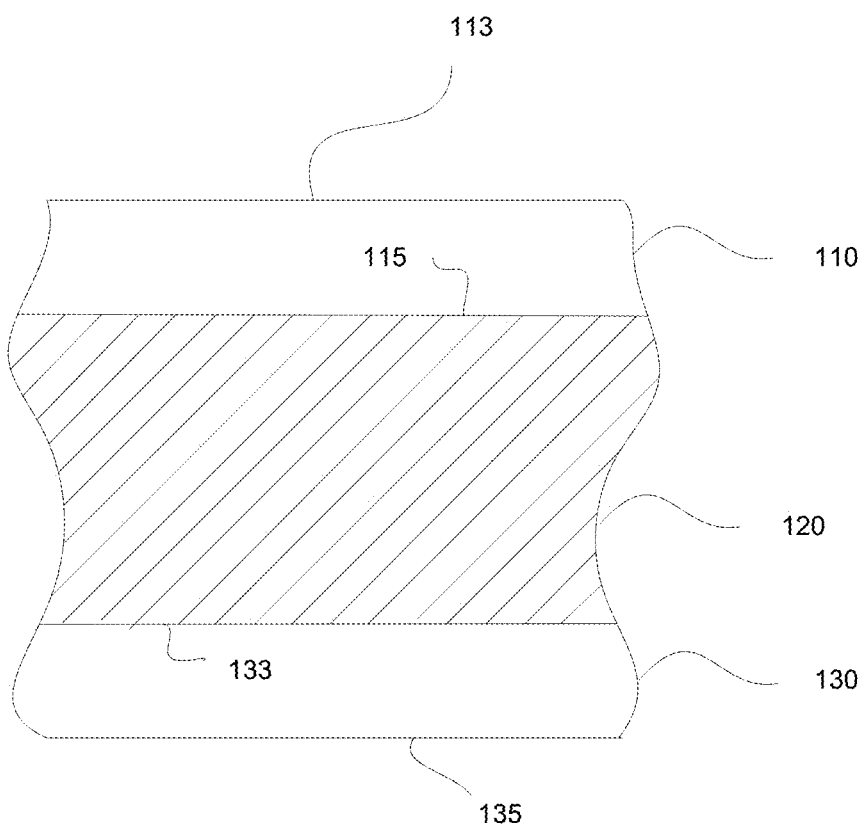
FIG. 1A is a cross section of a portion of a structure including activated carbon felt (ACF) as a filter, in accordance with one embodiment of the present disclosure.

FIG. 1A is a cross section of a portion of a multi-layer filter structure 100A, including activated carbon felt (ACF) as a filter layer, in accordance with one embodiment of the present disclosure. The ACF structure has a form factor that is configurable for use in a water bottle.

As shown in FIG. 1A, the filter structure 100A includes a first hydrophilic protective layer 110. A first surface 113 of the protective layer 110 is configured for exposure to water, such as, a stream of water for purposes of filtration. The protective layer 110 also includes a second surface 115 through which the water leaves the protective layer 110. In particular, the protective layer 110 is made from long fibers that may be bonded together by chemical, mechanical, heat or solvent processes. For instance, the nonwoven layer 110 may comprise a fabric. In one embodiment, the protective layer 110 comprises a cellulose based nonwoven layer.

Figure 1B:
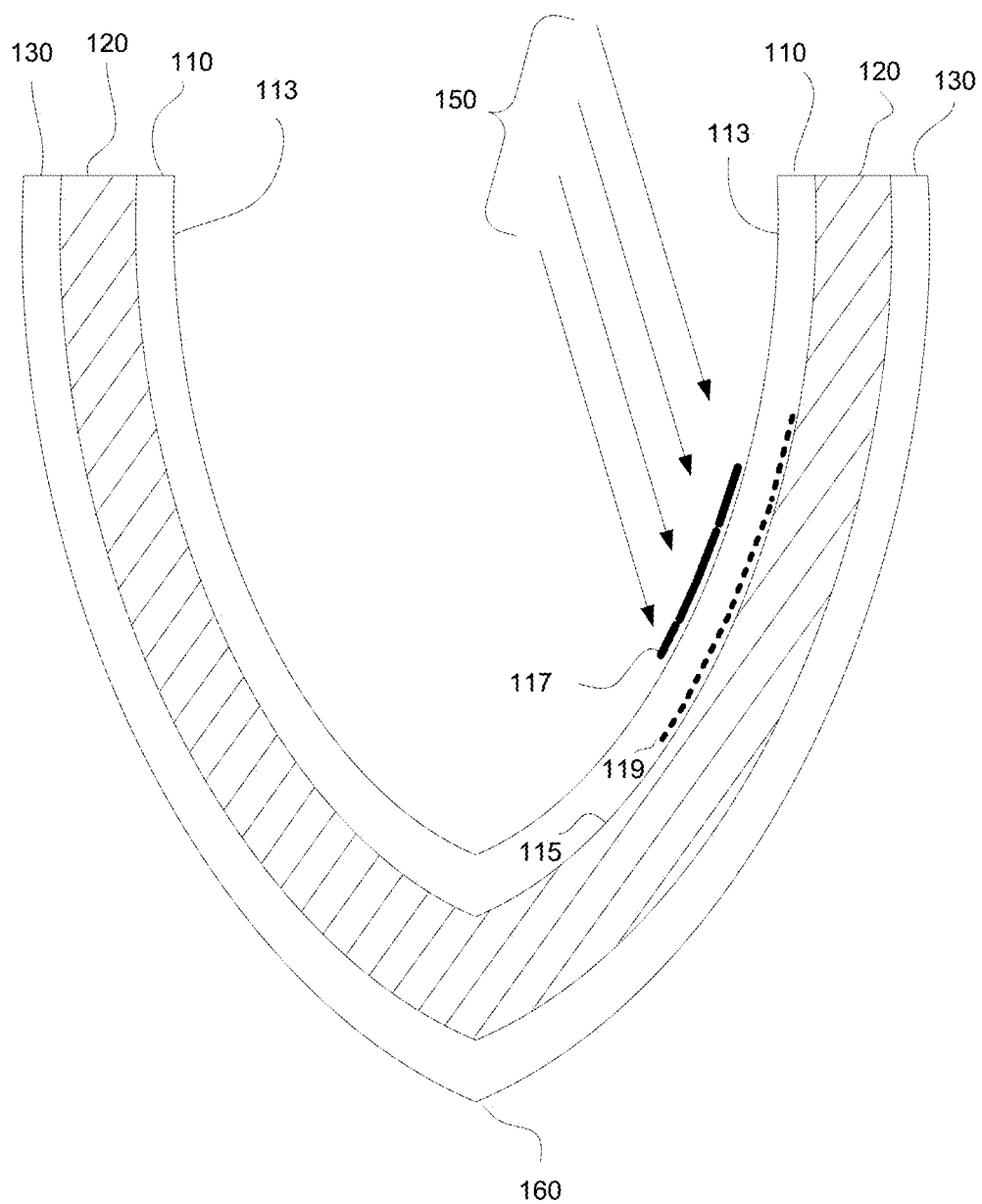
FIG. 1B is a cross section of a structure including ACF as a filter, in accordance with one embodiment of the present disclosure.

In one embodiment, the cellulose based nonwoven layer 110 comprises rayon. The rayon material provides strength and durability suitable for repeated use within a life cycle of a water filtration system. Further, the rayon material of the nonwoven layer 110 provides structural strength to more fragile underlying layers (e.g., the active filtration layer). This is beneficial during the manufacturing process in which various rolling processes may be employed which without adequate structural strength would subject the active filtration layer to tearing, flaking, cracking, and breakage. For example, the rayon, protective layers 110 and 130 protects the ACF layer 120 or media during processing as the material encounters friction passing over and/or through rollers and guides. Additionally, the rayon, protective layers 110 and 130 are useful during the water filtration cycle, as the layers 110 and 130 prevent flakes from the brittle carbon material in the ACF layer 120 from entering the water/air stream 150, as shown in FIG. 1B.

As previously mentioned, the filter structure 100A includes an ACF layer 120 adjacent to the second surface 115 of the first hydrophilic protective layer 110 that acts as the active filtration layer. The ACF layer 120 is configured for water filtration, primarily using gravity. That is, the ACF layer 120 receives the stream of water from the protective layer 110, and provides filtration as the water passes through the ACF layer 120.

In one embodiment, the ACF layer 120 comprises a single layer. That is, the construction and configuration of the single ACF layer 120 provides for suitable flow rates of water through its cross section. A single layer provides significant advantages, such as, lower cost in materials, and a smaller form factor especially when incorporated into a water bottle, thereby allowing for more space to be utilized for holding filtered water rather than reserving space for the filtration system.

The filter structure 100A also includes a second hydrophilic protective layer 130, which is similar in design, structure, and configuration as the first protective layer 110. In the second protective layer, a third surface 133 is adjacent to the ACF layer 120, and is configured for receiving filtered water from the ACF layer 120. A fourth surface 135 of the second protective layer 130 is configured for expelling the now filtered water, primarily using gravity. As shown in FIG. 1A, the first protective layer 110 and the second protective layer 130 sandwich the ACF layer 120. In one embodiment, the protective layer 130 comprises a cellulose based nonwoven layer. In still another embodiment, the cellulose based nonwoven layer comprises rayon.

FIG. 1B is a cross section of a shaped filter structure 100B including ACF as a filter, in accordance with one embodiment of the present disclosure. The filter structure 100B illustrates the use of the filter structure 100A of FIG. 1A. More specifically, the filter structure 100B illustrates a larger cross section than the filter structure 100A.

The shaped filter structure 100B includes the same layers as filter structure 100A, including a first hydrophilic protective layer 110 (e.g., cellulose based nonwoven, rayon, etc.), an ACF layer 120, and a second hydrophilic protective layer 130 (e.g., cellulose based nonwoven, rayon, etc. As shown, throughout the cross section the protective layers 110 and 120 sandwich the ACF layer 120.

In particular, the first surface 113 of the first hydrophilic protective layer 110 comprises a contact area 117, which defines an area receiving a stream of water 150. The contact area 117 may be larger or smaller depending on the stream 150, and may be located on different parts of the first surface 113. For instance, the contact area 117 may cover a large percentage of the surface of the first surface 113 as a two-dimensional water entry footprint. Purely for illustration, the contact area 117 may cover 20 to 80 percent of the entire surface of the first surface 113. In one embodiment, the entire surface area of the first surface 113 is within a range between 9 to 15 square inches. In one implementation, the entire surface area of the first surface 113 is between 9 to 10 square inches.

Further, the first hydrophilic protective layer 110 is configured to receive the stream of water 150 and to distribute the water 150 out a second surface 115, primarily using gravity. In one embodiment, the first protective layer 110 is configured to facilitate an expanded distribution of the water 150 out an exit area 119 of the second surface 115. That is, the first protective layer 110 acts as a distributor network for the incoming water 150. In part, this is due to the hydrophilic nature of the protective layer 110. For example, the hydrophilic nature of the cellulose based material (e.g., rayon) used in the protective layer 110 helps to distribute water. That is, as the water passes through the first protective layer 110 the two-dimensional surface area of the exit area or footprint 119 is larger than the entry footprint or contact area 117. Embodiments of the present invention disclose a filter structure 100B that ensures that there is no pooling of water at the bottom head portion 160, and thus no reduction in the flow rate by maximizing the usage of the filtering region or region between the contact area 117 and the exit area 119 used in the filter structure 100B.

As described, both the first and second protective layers 110 and 130 are hydrophilic in nature. This is distinct from previous protective layers previously used for protecting activated carbon. Typically, polypropylene or polyethylene are used for protection, but are not suitable in water filters because of their hydrophobic nature. That is, a prior art filter structure using polypropylene or polyethylene for protective layers 110 and 130 would experience pooling in the bottom head portion of any filter structure. This pooling negatively impacts flow rates and filter life, as well as overall consumer satisfaction.

Moreover, as shown in FIG. 1B, the filter structure 100B is shaped. That is, the cross section of filter structure 100B, including the first protective layer 110, the ACF layer 120, and the second protective layer 130 is shaped throughout the cross section. In one embodiment, the shape of the filter structure 100B is a curve, or has a curvature. For instance, the filter structure 100B has a varying slope throughout a cross section (e.g., that shown in FIG. 1B). That is, the shape of the filter structure 100B does not present a flat surface to the incoming stream of water 150. For instance, the shape of the filter structure is tapered, curved, or has a constantly changing angle of incidence to the water stream. In still another embodiment, the exposed surface of the multi-layer filtration structure is configured and shaped to minimize surface regions or contact regions 117 that are perpendicular to the direction of the stream of water. As such, for purposes of illustration only, FIG. 1B provides an illustration of the shape and/or curvature of the filter structure 100B, and embodiments of the present invention support various shapes and/or curvatures of the filter structure 100B.

In one embodiment, the cross section of the filter structure 100B includes a bottom head section 160, wherein the head section 160 also has a curvature. The bottom area is defined as the lowest area to which water would gravitate. In one embodiment, the sharpness of the curvature of the cross section of the filter structure 100B decreases towards a head section 160 that is located on the bottom of the filter structure 100B. That is, the degree and/or slope of the curvature decreases or lessens as the cross section reaches the bottom or head section 160.

In one embodiment, the ACF layer 120 is made of a material having a bending modulus that is sufficient to enable the ACF layer 120 to hold its shape. In particular, the bending modulus is of a sufficient value, such that the ACF material is stiff enough to hold its shape after reaching its final configuration.

The shape of the filter structure 100B facilitates and promotes increased flow rates through the ACF layer 120. That is, a flat cross section of the ACF layer 120 is inadequate for purposes of providing water filtration within a water filter because a flat ACF layer 120 has low flow rates of water filtration. In one embodiment, the shape of the filter structure 100B promotes a flow rate within the range of 0.5 to 1.0 gallons per minute, which is a typical flow rate of a household tap. As a result, for a surface area between 7 to 15 square inches of the filter structure 100B, no pooling is experienced at the bottom head section 160 of the filter structure 100B, especially when the water stream 150 is flowing at a rate between 0.5 to 1.0 gallons per minute, in accordance with one embodiment of the present disclosure.

As previously described, the shape of the filter structure 100B promotes higher flow rates than a filter structure that provides a flat surface to the water stream 150. In addition, the increase in flow rates does not come at a sacrifice of filtration purity. That is, the effectiveness of the filter structure 100B is maintained, such that with flow rates between 0.5 to 1.0 gallons per minute, filtration purity includes a removal of greater than or equal to 50 percent of chlorine for at least 40 gallons.

For example, the shaped filter structure 100B meets an NSF-42 standard, as defined by "The Public Health and Safety Organization," in one embodiment. Specifically, the shaped filter structure 100B meets the NSF-42 standard using a single layer, even at very low flow rates. Without the designed shape of the structure 100B (e.g., a flat surface), multiple ACF layers would be required to meet the NSF-42 standard (e.g., filtration of at least 50 percent chlorine for at least 40 gallons). That is, in embodiments of the present invention, the shaped filter structure 100B provides for consumer relevant flow rates using a single ACF layer 120 meeting specific chlorine requirements, such as filtration of at least 50 percent chlorine for at least 40 gallons (e.g., NSF-42 standard).

In still another embodiment, the filter structure 100B does not require pre-wetting. That is, the ACF layer 120 is configured such that it is readily available at first use, such that the user can immediately filter drinkable water.

Figure 2:
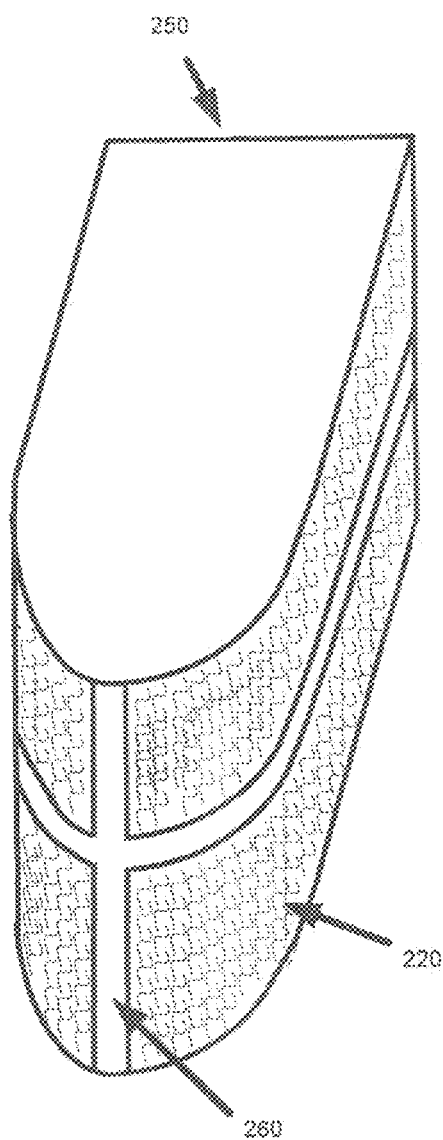
FIG. 2 is a perspective view of a housing configured to hold a structure including ACF as a filter, in accordance with one embodiment of the present disclosure.

FIG. 2 is a perspective view of a filter housing 200 configured to hold a filter structure including ACF as a filter, in accordance with one embodiment of the present disclosure. As shown, housing 200 supports a filter structure 220. In one implementation, the filter structure 220 comprises a multi-layer filtration material configured for water filtration, primarily using gravity, wherein the filtration material has a curvature. For instance, the filtration material includes the filter structure 100A and 100B of FIGS. 1A-B.

In one implementation, the filter housing 200 facilitates supporting the multi-layer filter structure 220 in a rigid state. That is, the filter housing 200 enables and/or supports the curvature in the filter structure 220.

The filter housing 200 includes a bottom head portion 260 towards which water gravitates in a typical use scenario. For instance, a top portion 250 of the filter housing 250 is oriented upwards away from the direction of gravity, and configured to receive a stream of water. That is, the top portion 250 has an opening (not shown) configured to receive the stream of water. In addition, the interior (not shown) of the filter housing 200 is hollow, such that the inner surface of the filter structure 220 is exposed to the water stream.

In one embodiment, the filter housing 200 is configured for attaching to a support structure, such as a lid to a water bottle. In that case, the filter housing 200 forms a throughway through the structure, wherein the throughway is configured to receive a stream of water, filter the stream of water, and then exit filtered water through an exit or egress port. The support structure is further described in FIGS. 3A-C, below.

Figure 3A:
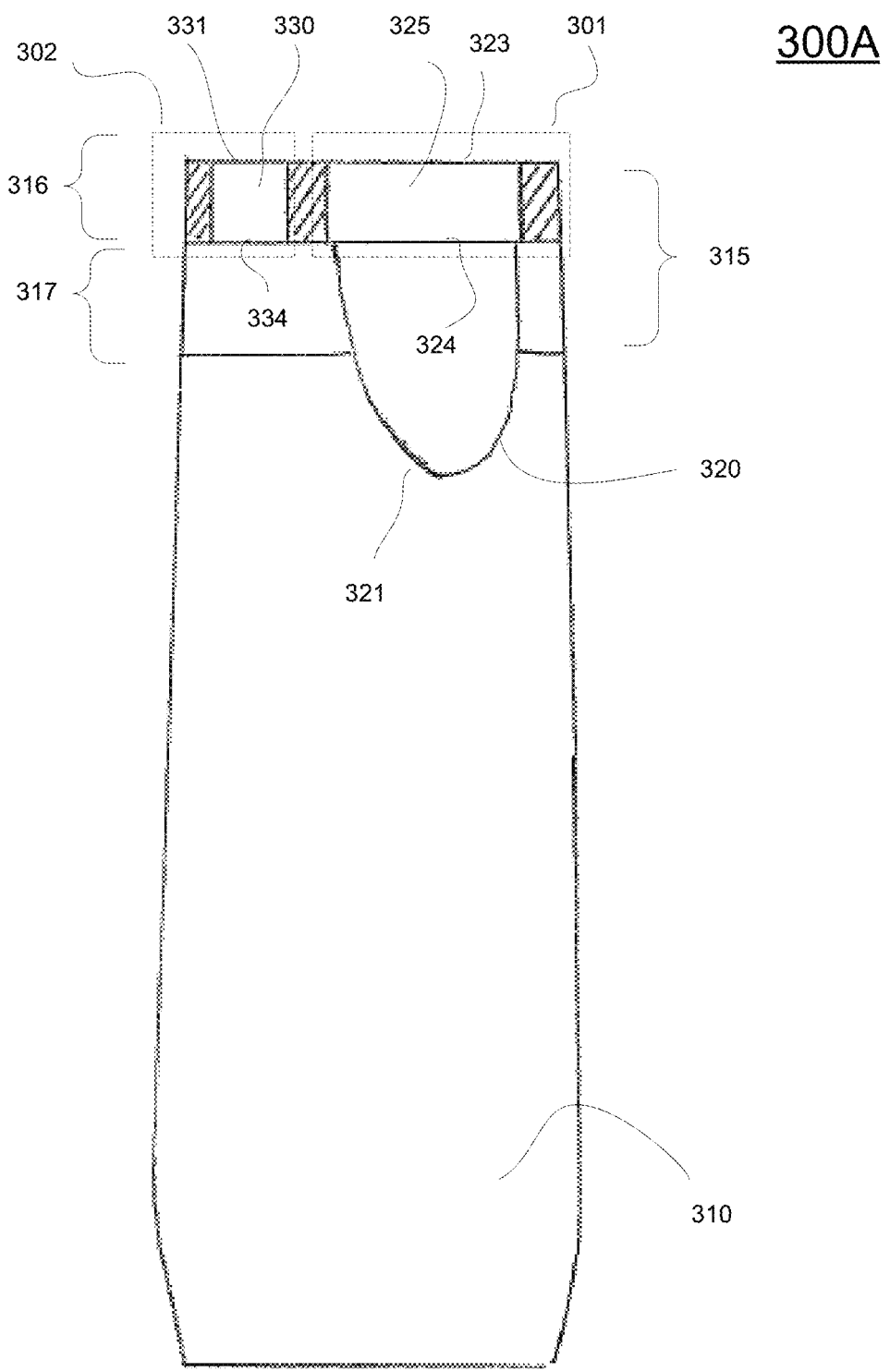
FIG. 3A is a side view of a portable water bottle including a structure capable of filtering water without the use of a reservoir and without the use of a built-in venting mechanism, in accordance with one embodiment of the present disclosure.

FIG. 3A is a side view of a portable water bottle 300A including a structure capable of filtering water without the use of a reservoir and without the use of a built-in venting mechanism, in accordance with one embodiment of the present disclosure. In various implementations, the portable water bottle 300A utilizes the filter structures described in FIGS. 1A-B and 2. As such, use of the portable water bottle 300A allows for on demand filtration, wherein water is filtered at a high flow rate meeting and/or exceeding the flow rate of the stream of water provided to the water filter for filtering.

As shown in FIG. 3A, the portable water bottle 300A includes a support 315 that is configured to receive a multi-layer filtration material 320. The support 315 is configured as a lid to the reservoir 310, in one embodiment. The reservoir holds filtered water. More particularly, the support 315 includes a top portion 316 and a sleeve region 317 that is adjacent and attached to the top portion 316. The top portion 316 is exposed to the environment and to the user. For example, the top portion 316 is used to facilitate delivery of water to the filtration system in the water bottle 300A, and for accessing filtered water through a drinking portal or opening 331. The sleeve 317 is configured for purposes of providing a snug and water tight fitting to the reservoir 310. That is, the sleeve 317 is configured to receive reservoir 310 for holding filtered water. Various means for attaching the structure 315 via sleeve 317 is supported, such as, a screw top system, snap-on construction, latched connectors, etc.

The top portion 316 of the support 315 includes a first region 301 and a second region 302, wherein the two regions are separate from each other. Specifically, the first region 301 is independent of and isolated from the second region 302. For instance, water that is present in the first region 301 cannot enter the second region 302 without traveling through another region, such as, the filtered water reservoir 310. The reverse is also true, wherein water present in the second region 302 cannot enter the first region 301 without traveling through another region.

The support 315 includes a first opening 323 that is configured for receiving a stream of water. More specifically, the first opening 323 is located within the first region 301. The first opening provides access to a throughway 325 that is formed between the first opening 323 and a multi-layer filtration material 320 that is configured for water filtration, primarily using gravity. That is, the throughway 325 has a first end that includes the first opening 323, and a second end 324 including another opening that opens into the filtration material 320. The multi-layer filtration material 320 is attached to the support 315 in such a manner to allow an incoming stream of water to reach and contact the filtration material 320. For instance, the filtration material 320 is attached to the second end 324. In that manner, the filtration material 320 provides for on demand filtration, wherein water is filtered at a high flow rate meeting and/or exceeding the flow rate of the stream of water provided to the water filter for filtering. As such, no reservoir holding pre-filtered water is necessary. In one embodiment, the filtration material 320 is similarly configured as the filtration structures 100A, 100B and 220 described in FIGS. 1A-B and 2, and as such includes an area that is shaped or has a curvature. For instance, at least the bottom head portion 321 of the filtration material 320 is shaped and/or has a curvature.

As shown in FIG. 3A, the filtration material 320 is hanging from structure 315. In particular, filtration material 320 is hanging from the second end 324 down into the reservoir 310. In this configuration, the filter material 320 may include a housing for supporting and maintaining a shape, in one implementation. In another implementation, the filter material 320 may be free hanging without the use of a filter housing. Incoming water entering at opening 323 is filtered by the filtration material 320 and deposited into the reservoir 310. The nature of the filtration material 320 is such that should water return through the filtration material 320 through a back flow process, it remains in the first region 301 and is isolated from the second region 302, which is used for drinking or accessing filtered water stored in reservoir 310. For example, the first region 301 includes a water proof cap 350 that prevents water from entering or exiting the first region 301, as is described in FIG. 3B. In addition, any water re-entering the first region 301 is able to return back to the reservoir 310 after further filtration by the filtration material 320, and as such is deposited as filtered water in reservoir 310.

In addition, water bottle 300A is configured to receive a stream of water and perform water filtration without an internal or dedicated venting mechanism. That is, the filtration material 320 is configured to provide sufficient venting during a filtration process. As such, no dedicated venting feature or system is needed to vent the displaced air within the reservoir 310 as filtered water enters the internal volume defined by reservoir 310. In particular, the highly porous nature of the filtration material 320 (e.g., the ACF layer contained within the filtration material 320) negates the need for a dedicated venting feature. This, in turn greatly reduces design and manufacturing complexity.

Structure 315 also includes a second opening 331 that is configured for providing access to filtered water held in the reservoir 310. More specifically, the second opening 331 is located within the second region 302. The second opening 331 provides access to a throughway 330 that is formed between the second opening 331 and the reservoir 310. That is, the throughway 330 has a first end that includes the second opening 331, and a second end 334 including another opening that opens into the reservoir 310. As such, the water bottle 300A may be tipped in such a manner that water held in the reservoir 310 will flow out through the throughway 330 and out of second opening 331. That is, the second opening 331 is configured as an outtake for filtered water from reservoir 310 to flow through.

In one embodiment, the second opening is of a sufficient size to promote chuggable drinking That is, water exiting from the second opening 331 is not severely limited and can meet and match any desired rate of chugging water that the user desires.

Figure 3B:
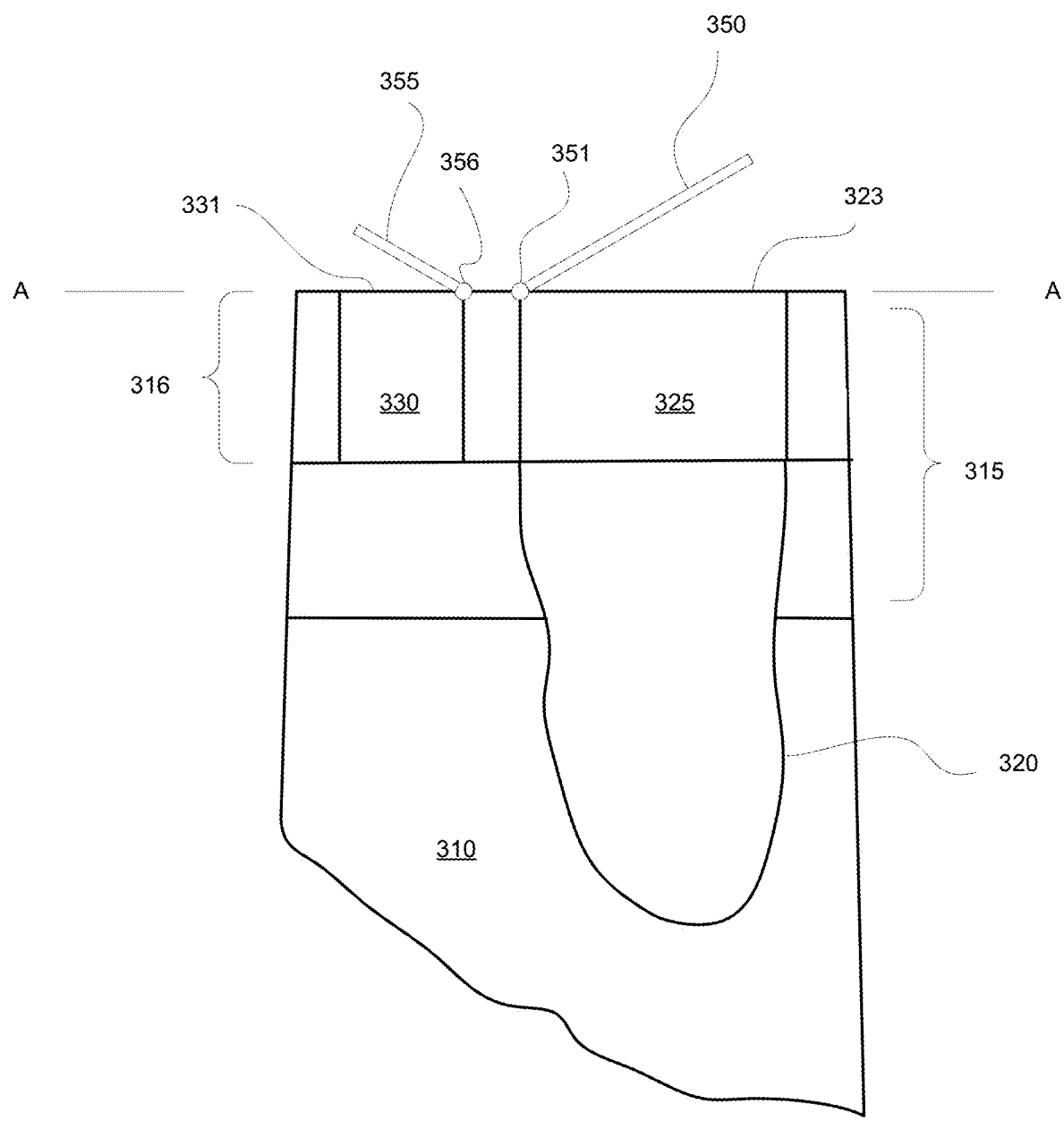
FIG. 3B is a close-up view of a lid portion of the portable water bottle shown in FIG. 3A, wherein the lid is configured to hold a structure including ACF as a filter, in accordance with one embodiment of the present disclosure.

FIG. 3B is a close-up view of the support or lid portion 315 of the portable water bottle 300A shown in FIG. 3A, wherein the support or lid portion 315 is configured to hold a filter structure 320 including ACF as a filter, in accordance with one embodiment of the present disclosure.

As shown, the support or lid portion 315 is configured to be leak proof, and is configurable to accept a reservoir for holding filtered water. For instance, the leak proof lid portion 315 and the reservoir 310 comprise a portable gravity fed water bottle. More specifically, a first leak proof cap 350 is attached to the support or lid portion 315. For instance, a hinge mechanism 351 is attached both to the leak proof cap 350 and structure or lid 315, and is configured to allow the leak proof cap 350 to open and close. Also, the leak proof cap 350 provides access to opening 323. As such, a stream of water is delivered into the portable water bottle 300A through first opening 323 for purposes of filtration. After the filtration process is complete, the leak proof cap 350 is arranged to close the first opening 323, such that any residual water due to back-flow is trapped within the throughway 325, and cannot exit and spill out through opening 323.

In addition, the lid portion 315 includes a second leak proof cap 355 that is attached to the support or lid portion 315. Specifically, a hinge mechanism 356 is attached both to the leak proof cap 355 and structure or lid 315, and is configured to allow the leak proof cap 355 to open and close. Also, the leak proof cap 355 provides access to the second opening 331. As such, by opening the second leak proof cap 355, access to filtered water contained in reservoir 310 is provided through throughway 330 for purposes of drinking, as previously described. After finishing drinking, access to the reservoir is no longer necessary, and as such, the second leak proof cap 355 is arranged to close the second opening 331. In that manner, any filtered water held in reservoir 310 cannot spill out through opening 330.

Moreover, the first opening 323 and the second openings 331 are isolated from each other, such that when cap 350 and cap 355 are closed, the water bottle 300A is leak proof. In some other implementations, when cap 350 and cap 355 are closed, water bottle 300A is also air tight. Specifically, the first region 301 that contains the first opening 323 and the second region 302 that contains the second opening 331 are isolated from each other. As such, even though cap 350 is open, and cap 355 is closed, filtered water in the second region 302 cannot directly enter the first region 301 without going through the reservoir 310 and filter material 320. In addition, unfiltered water in the first region 301 cannot directly enter and contaminate the second region 302 without going through the filter structure 320 and reservoir 310. In addition, even though cap 355 is open and cap 350 is closed, filtered water in the second region 302 cannot directly enter the first region 301 without going through the reservoir 310 and filter structure 320. Also, unfiltered residual water in the first region 301 cannot directly enter and contaminate the second region 302 without going through the filter structure 320 and the reservoir 310.

In one embodiment, both the first opening 323 and the second opening 331 are substantially on the same plane. That is, the top portion 316 and the filtration material 320 are designed so that the first opening 323 and the second opening 331 are substantially on the same plane, such as, the plane defined by line A-A in FIG. 3B. more specifically, the openings for drinking 331 and for filtering 323 are located on the same plane that is generally perpendicular to the direction of water flow when the water bottle is standing upright, and in a position to receive the water. This same plane configuration promotes single handed operation of the water bottle, and eliminates any need for a side pour operation, wherein the filtration opening is located on a completely separate plane.

In one embodiment, the leak proof structure or lid portion 315 is configurable to accept one or more types of reservoirs, wherein each reservoir is adapted to hold filtered water. Moreover, the filter structure that is configured for attaching to the lid portion 315 is also configurable to be attached to one or more types of lid portions 315. In that manner, both the lid portion 315 and/or filter structure 320 is interchangeable and/or replaceable within many different water treatment and holding systems.

Figure 3C:
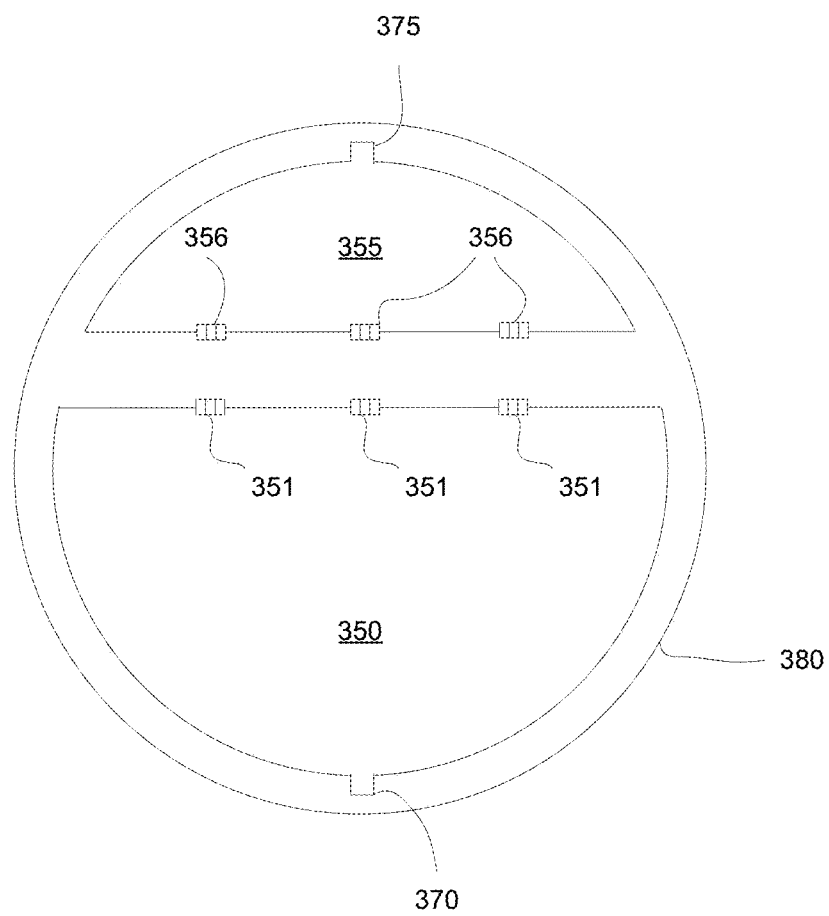
FIG. 3C is a top view of the lid portion of the portable water bottle shown in FIG. 3A, wherein the lid includes two separate regions including a first region for receiving unfiltered water, and a second region for providing access to filtered water, in accordance with one embodiment of the present disclosure.

FIG. 3C is a top view of the lid portion 315 of the portable water bottle 300A shown in FIG. 3A, wherein the lid includes two separate regions including a first region for receiving unfiltered water, and a second region for providing access to filtered water, in accordance with one embodiment of the present disclosure. As shown, lid portion 315 includes a first leak proof cap 350 that provides access to first opening 323, wherein hinges 351 allows cap 350 to open and close. Also, lid portion 315 includes a second leak proof cap 355 that provides access to second opening 331, wherein hinges 356 allow cap 355 to open and close.

In addition, first cap 350 includes a locking mechanism 370 that is configured to lock the first leak proof cap 350 to the rim 380 of the structure or lid portion 315. Also, second cap 355 includes a locking mechanism 375 that is configured to lock the second leak proof cap 355 to the rim 380 of the structure or lid portion 315. The locking mechanisms 370 and 375 may be configured in any fashion, such as tight fitting snaps, etc.

Figure 4:
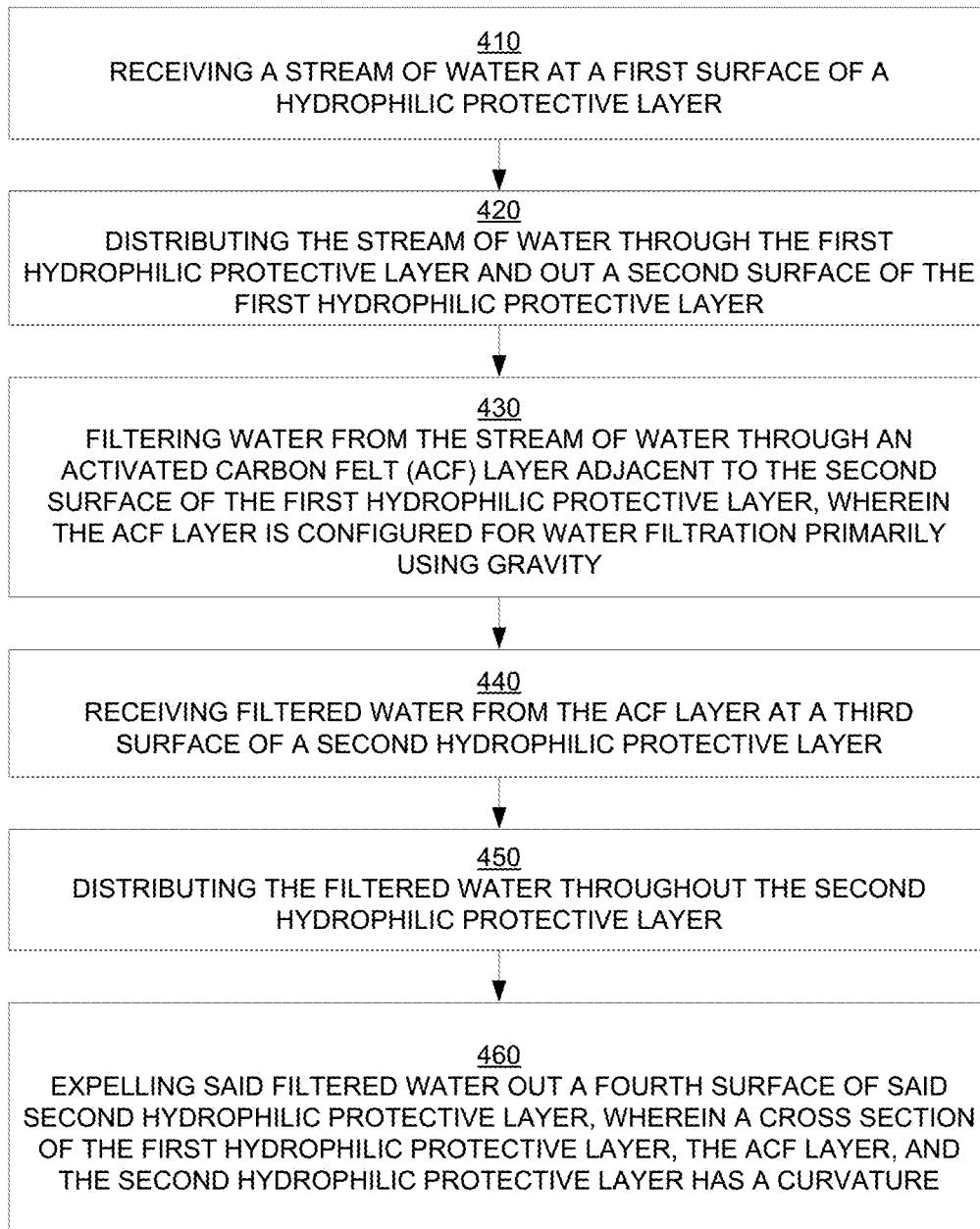
FIG. 4 is a flow chart illustrating a method for filtering water through an ACF layer that is shaped with a curvature, in accordance with one embodiment of the present disclosure.

FIG. 4 is a flow chart 400 illustrating a method for filtering water through an ACF layer that is shaped with a curvature, in accordance with one embodiment of the present disclosure. The method outlined in flow chart 400 is implementable using the filter structures and gravity fed water bottles of FIGS. 1-3, in embodiments of the present invention. For instance, the method outlined in flow chart 400 illustrates the general use of a filter structure described in FIGS. 1A-B and 2.

At 410, the method includes receiving a stream of water at a first surface of a hydrophilic protective layer. In one embodiment, the hydrophilic protective layer comprises a cellulose based nonwoven layer, and more particularly, in one further embodiment comprises rayon. Rayon provides a durable yet hydrophilic material for receiving and distributing water.

At 420, the method includes distributing the stream of water through the first protective layer and out a second surface of the first protective layer. That is, the hydrophilic protective layer acts as a distributing network that receives water over a first surface footprint, and quickly distributes that water through a larger footprint throughout the interior of the first protective layer. This is possible, in part, because the rayon based nonwoven layer is hydrophilic. The water then exits the protective layer out the second surface that has the larger footprint.

At 430, the method includes filtering water from the stream of water through an activated carbon felt (ACF) layer that is adjacent to the second surface of the first protective layer. The ACF layer is configured for water filtration primarily using gravity. As previously described, the ACF layer is shaped in such a manner to increase the flow rate of water filtration. In that manner, the flow rate allows for a filter as you fill implementation that is suitable for on-demand portable water bottle systems. This type of system provides for an on-demand bottle that gives the user a free drinking experience, by giving the user filtered water as the water bottle is filling. That is, no active filtering process powered by the user is necessary (e.g., squeezing the bottle).

At 440, the method includes receiving filtered water from the ACF layer at a second hydrophilic protective layer. More specifically, water is received at a third surface of the second protective layer, wherein the third surface is adjacent of the ACF layer. The second protective layer is similar in structure and configuration as the first hydrophilic protective layer, as previously described. For example, in one embodiment, the second hydrophilic protective layer comprises a cellulose based nonwoven layer, and more particularly, in one further embodiment comprises rayon.

At 450, the method includes distributing the now filtered water through the second protective layer and out a fourth surface of the second protective layer. That is, the second protective layer also acts as a distributing network that receives water over a first surface footprint, and quickly distributes that water through a larger footprint throughout the interior of the second protective layer. This is possible, in part, because the second protective layer is hydrophilic.

At 460, the water then exits the second hydrophilic protective layer out the fourth surface that has the larger footprint. Specially, the filtered water is expelled out of the second protective layer, such as, into a reservoir holding filtered water.

As described, the filter structure includes first and second hydrophilic protective layers that sandwich an ACF layer. Moreover, the filter structure has a curvature to promote higher rates of flow for purposes of water filtration. In that manner, the method for filtering water through the filter structure as outlined in flow chart 400 is implementable in an on-demand portable water bottle system.

Figure 5:
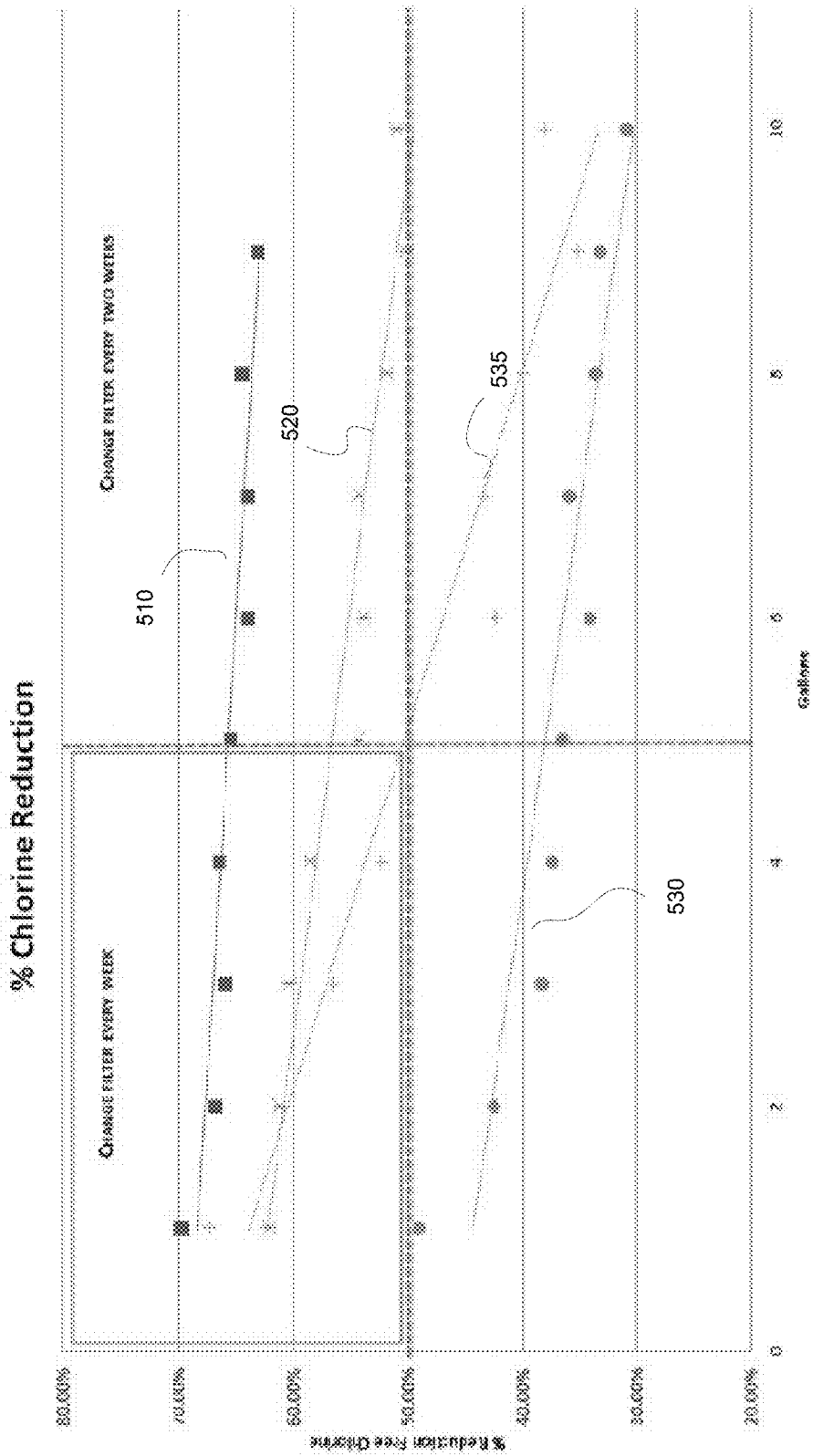
FIG. 5 is table illustrating the rate of chlorine reduction over a lifetime of a filter structure, in accordance with one embodiment of the present disclosure.

FIG. 5 is a chart 500 illustrating the rate of chlorine reduction over a lifetime of a filter structure, in accordance with one embodiment of the present disclosure. As shown, the y-axis provides a chlorine reduction metric from 20 percent to 80 percent of reduction of free chlorine. The x-axis illustrates the life of the filter structure in gallons of water filtered.

In particular, line 530 is representative of typical filter structure that have no shape and does not use cellulose based layers to protect the sandwiched ACF layer. As shown, the filter structure in line 530 has a low filtration quality, namely below 50 percent filtration or reduction of free chlorine, by percentage.

Line 535 represents another filter structure that may have the hydrophilic protective layers of embodiments of the present invention, including rayon based cellulose based layers sandwiching an ACF layer, but may not have the proper shape. As such, initially, the filter structure in line 535 operates with sufficient filtration quality, but the rate of chlorine reduction immediately is reduced over time, such that the overall percentage rate of chlorine reduction is again below 50 percent.

Lines 510 and 520 represent filter structures that have the hydrophilic protective layers of embodiments of the present invention, including rayon based cellulose based layers, sandwiching an ACF layer, and have the proper shape. The filter structure of line 510 may have a better shape than that of the filter structure represented by line 520, and thus has a higher filtration quality as shown in FIG. 5. In particular, both of these filter structures are able to provide over 50 percent of reduction in free chlorine Thus, according to embodiments of the present disclosure, systems and methods are described providing for an on-demand gravity fed water bottle including a filtration system capable of filtering water at high flow rates sufficient to eliminate the need for a pre-filtered water reservoir.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

What is claimed:

1. A filter structure, comprising:
a first hydrophilic protective layer comprising a first surface exposable to an incoming stream of water, wherein said first surface comprises a contact area configured to receive said stream, wherein said first hydrophilic protective layer is configured to receive said incoming stream of water at said first surface and to distribute water out a second surface of said first hydrophilic protective layer primarily using gravity;
an activated carbon felt (ACF) layer in contact throughout with said second surface of said first hydrophilic protective layer, wherein said ACF layer is configured for water filtration primarily using gravity;
a second hydrophilic protective layer comprising a first surface in contact throughout with said ACF layer configured for receiving filtered water from said ACF layer and to distribute water out a second surface for passing said filtered water primarily using gravity;
wherein said first hydrophilic protective layer and said second hydrophilic protective layer distribute the water out to expand an outgoing water footprint relative to an incoming water footprint;
wherein a cross section of said first hydrophilic protective layer, said ACF layer, and said second hydrophilic protective layer is generally U-shaped and configured such that throughout said generally U-shaped said cross section, including the portion of the cross section where the contact area is located, said ACF layer has a substantially uniform thickness and is coextensive with said first hydrophilic protective layer and said second hydrophilic protective layer.

2. The filter structure of claim 1, wherein at least one of said first and second hydrophilic protective layer comprises a cellulose based nonwoven layer formed from long fibers that are bonded together by at least one of a chemical process, a mechanical process, a heat process, or a solvent process.

3. The filter structure of claim 2, wherein said cellulose based nonwoven layer comprises rayon.

4. The filter structure of claim 1, wherein part of said generally U-shaped cross section of said filter structure has a curvature, and a sharpness of said curvature of said generally U-shaped cross section decreases towards a bottom head section.

5. The filter structure of claim 1, wherein said generally U-shaped cross section of said first hydrophilic protective layer, said ACF layer, and said second hydrophilic protective layer comprises a curvature with a varying slope throughout including to and at a bottom head section.

6. The filter structure of claim 5, wherein said ACF layer comprises a single layer.

7. The filter structure of claim 6, wherein said ACF layer removes at least 50 percent chlorine for at least 40 gallons.

8. The filter structure of claim 7, wherein an entire surface area of said first surface of said first hydrophilic protective layer has a size that is in a range between 9 to 15 square inches.

9. The filter structure of claim 6, wherein a structural combination of said first hydrophilic protective layer, said ACF layer, and said second hydrophilic protective layer is characterized with a bending modulus that is of sufficient value such that said structural combination three-layer filtration material is stiff enough to maintain said U-shaped configuration in said cross section such that said structural combination three-layer filtration material does not present a flat surface to the incoming stream of water.

10. The filter structure of claim 6, wherein said ACF layer has a bending modulus that is of sufficient value such that said ACF layer holds a shape after reaching a final configuration including said U-shaped configuration in said cross section such that said structural combination three-layer filtration material does not present a flat surface to the incoming stream of water.

11. The filter structure of claim 6, wherein said first hydrophilic protective layer and said second hydrophilic protective layer are in contact and sandwich said ACF layer throughout.

12. The filter structure of claim 1, wherein said ACF layer meets a NSF-42 standard.

13. The filter structure of claim 1, wherein a structural combination of said first hydrophilic protective layer, said ACF layer, and said second hydrophilic protective layer does not require pre-wetting to filter water.

14. A method for filtering, comprising:
providing, on-demand, filtered water to a user by:
contacting a single continuously flowing stream of water at a first contact area of a first surface of a first hydrophilic protective layer, said stream of water having a first flow rate and a first footprint at said first contact area on said first surface;
distributing said single continuously flowing stream of water throughout said first hydrophilic protective layer and out a second surface of said first hydrophilic protective layer, wherein said single continuously flowing stream of water has a second footprint larger than the first footprint at said second surface;
filtering, at said first flow rate, water from said single continuously flowing stream of water through an activated carbon felt (ACF) layer adjacent to said second surface of said first hydrophilic protective layer, wherein said ACF layer is configured for water filtration primarily using gravity, and wherein said single continuously flowing stream of water flows through said ACF layer at said first flow rate of said single continuously flowing stream of water through said first hydrophilic protective layer, and wherein said first flow rate is within a range of 0.5 gallons per minute to 1.0 gallons per minute;
receiving filtered water from said ACF layer at a third surface of a second hydrophilic protective layer;
distributing said filtered water throughout said second hydrophilic protective layer; and
draining said filtered water out a fourth surface of said second hydrophilic protective layer, wherein said single continuously flowing stream of water has a third footprint larger than the first footprint at said fourth surface;

wherein a cross section of said first hydrophilic protective layer, said ACF layer, and said second hydrophilic protective layer has a curvature with a varying slope, and wherein the method is performed at said flow rates without any pooling of water in respective bottom portions of the first hydrophilic layer, the ACF layer, and the second hydrophilic layer.

15. The method of claim 14, wherein a sharpness of said curvature of said cross section decreases towards a bottom head section.

16. The method of claim 14, wherein at least one of said first and second hydrophilic protective layer comprises a cellulose based nonwoven layer.

17. The method of claim 16, wherein said cellulose based nonwoven layer comprises rayon.

18. The method of claim 15, wherein the stream of water passing through the first hydrophilic protective layer, the ACF layer, and the second hydrophilic protective layer is a continuously flowing stream of water.

19. The method of claim 18, wherein said ACF layer is provided in contact and sandwiched throughout said first hydrophilic protective layer and said second hydrophilic protective layer.

20. The method of claim 19, wherein filtering at said first flow rate through said ACF layer includes removing removes at least 50 percent chlorine for at least 40 gallons.

21. A filter structure, comprising:
a multi-layer filtration material configured for water filtration primarily using gravity, wherein said multi-layer filtration material has formed together:
a first hydrophilic layer having a first water contact surface and a second surface,
a second hydrophilic layer having a third surface and a fourth surface, and
a single activated carbon felt (ACF) layer disposed between said first hydrophilic layer and said second hydrophilic layer, wherein the ACF contacts the second surface of the first hydrophilic layer and the third surface of the second hydrophilic layer;
wherein said multi-layer filtration material is formed to have a curvature,
wherein said first hydrophilic layer, said second hydrophilic layer, and said ACF layer are configured and arranged such that in a side cross section of said multi-layer filtration material there is no gap between said second surface of said first hydrophilic layer and the ACF layer and there is no gap between said third surface of said second hydrophilic layer and said ACF layer; and
wherein a bend modulus of the ACF member layer maintains the formed curvature of said multi-layer filtration material;
wherein a flow rate of a single continuously flowing stream of water out of said multi-layer filtration material is substantially not reduced relative to a flow rate into said multi-layer filtration material;
wherein said flow rate is maintained at least by one of said first hydrophilic layer of said multi-layer filtration material or said formed curvature of said multi-layer filtration material.

22. The filter structure of claim 21, further comprising:
a support configured to receive said multi-layer filtration material and hold said multilayer filtration material in a set position, wherein said support comprises a first region and a second region separate from each other;
a first opening in said support, wherein said multi-layer filtration material is attached to said support such that a throughway is formed in said first region between said first opening and said multi-layer filtration material to allow said continuously flowing stream of water to contact said multi-layer filtration material along said curvature without an internal venting mechanism; and
a second opening in said second region of said support configured as an outtake for filtered water to flow through.

23. The filter structure of claim 22, wherein said first opening and said second opening reside in a common plane.

24. The filter structure of claim 22, wherein said support is configured to receive a reservoir for holding filtered water.

25. The filter structure of claim 24, wherein said support is configured without a venting mechanism for releasing displaced air when filling said reservoir with filtered water.

26. The filter structure of claim 22, wherein said support is configured without a pre-filtered holding reservoir.

27. The filter structure of claim 22, further comprising:
a leak proof cap attached to said support and providing access to said first opening and to said second opening; and
a hinge mechanism attached to said leak proof cap and said support configured to allow said leak proof cap to open and close.

28. The filter structure of claim 27, further comprising a reservoir, wherein said leak proof cap is configurable to accept said reservoir for holding filtered water, and wherein said leak proof cap and said reservoir comprise a portable gravity fed water bottle.

29. The filter structure of claim 28, wherein said leak proof cap is configurable to accept one or more types of reservoirs each for holding filtered water.

30. The filter structure of claim 21, wherein:
said first hydrophilic layer comprises a first rayon based nonwoven layer comprising a first surface exposable to said continuously flowing stream of water, wherein said first surface comprises a contact area receiving said continuously flowing stream of water, wherein said first rayon based nonwoven layer is configured to receive said continuously flowing stream of water at a first footprint and to distribute said continuously flowing stream of water out a second surface at a second footprint larger than the first footprint;
said ACF layer is adjacent to said second surface of said first rayon based nonwoven layer; and
said second hydrophilic layer comprises a second rayon based nonwoven layer comprising a first surface adjacent said ACF layer configured for receiving said continuously flowing stream of water from said ACF layer at a third footprint and a second surface for expelling said continuously flowing stream of water at a fourth footprint larger than the third footprint, and said first and second nonwoven layers sandwich said ACF layer.

31. The filter structure of claim 21, wherein an exposed surface of said multi-layer filtration material that is exposable to said continuously flowing stream of stream of water is configured to minimize surface regions that are perpendicular to a direction of said continuously flowing stream of water.

* * * * *